CONTROL APPARATUS WITH SOFT START
Filed Aug. 22, 1966
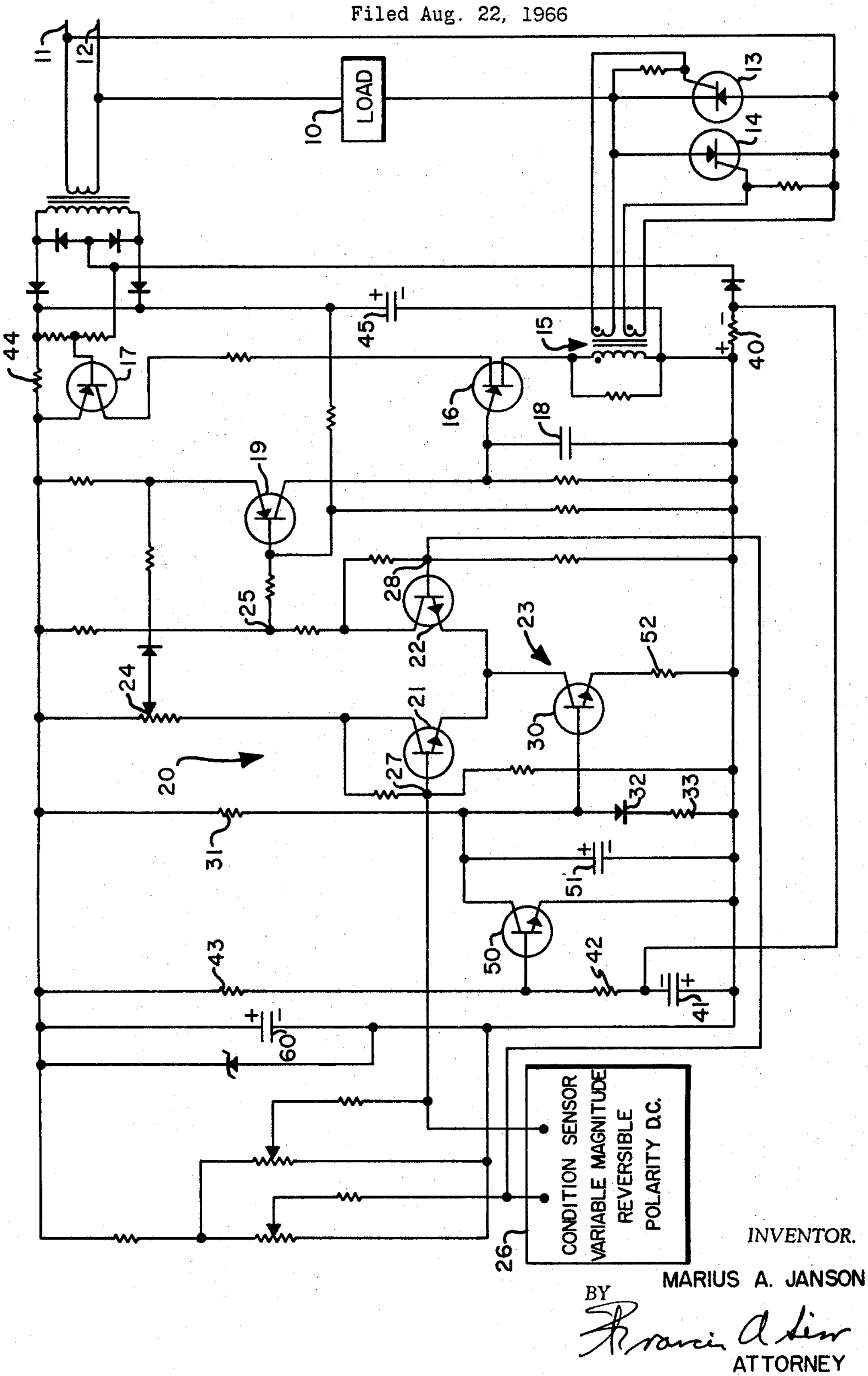
INVENTOR.
MARIUS A. JANSON
BY [signature]
ATTORNEY United States Patent Office 3,389,328
Patented June 18, 1968

3,389,328

CONTROL APPARATUS WITH SOFT START

Marius A. Janson, Minneapolis, Minn., assignor to Honeywell Inc., Minneapolis, Minn., a corporation of Delaware Filed Aug. 22, 1966, Ser. No. 574,109
7 Claims. (Cl. 323—19)

My invention is concerned with an improved control apparatus to regulate the amount of power applied to or energization of a load from a source of AC voltage, the amount of power being determined by a condition sensor, and to provide soft start energization of the load upon initial application of the AC source or upon failure of the source and subsequent restoration thereof.

As is well known in the art, soft start insures that initial energization of a load is of a reduced magnitude, this magnitude gradually increasing over a relatively short time period until the load is energized to the extent determined by the condition sensor. Normally, this soft start covers a small number of cycles of the AC source. Soft starting of a load eliminates unwanted transient electrical effects.

While the soft start concept is old, I provide this end result by means of a novel structure incorporating a differential amplifier and a constant current means associated with the differential amplifier. The constant current means functions to maintain the total current of the different amplifier at a constant value, this improving the performance of the differential amplifier. Upon initial application of the AC voltage source or upon interruption of the AC source, and the subsequent restoration of the voltage, the constant current means of my invention functions as a soft start means. The time period of soft start insures gradually increasing power to the load, and after a time period the load is again energized at the level determined by the condition sensor, the constant current means then functioning to provide improved operation of the differential amplifier.

Referring to the single figure, which shows a preferred embodiment of my invention, reference numeral 10 designates a load which is energized from a source of AC voltage 11–12 under the control of a pair of silicon controlled rectifiers 13 and 14.

SCR's 13 and 14 are controlled from a transformer 15, the time of firing of the SCR's being determined by the time of firing of a unijunction transistor 16. Operation of unijunction transistor 16 is synchronized to the AC line by means of a synchronizing transistor 17. The firing angle (as related to a half cycle of source 11–12) of unijunction 16 is determined by the charging rate of a capacitor 18 which is charged through a transistor 19.

The emitter-base control circuit of transistor 19 is controlled by the output means of a differential amplifier generally designated by reference numeral 20. Differential amplifier 20 includes a pair of common emitter connected transistors 21 and 22, the common emitter circuit including a network 23, which utilizes my invention, to be described.

The output of differential amplifier 20 occurs at terminals 24 and 25 and this output is connected to the input of transistor 19. As is well known, the sum of the collector-emitter currents of the differential amplifier transistors 21 and 22 tends to be a constant value, the portion of the sum which flows through each of the transistors being determined by a condition sensor 26 connected to the input means 27 and 28 of the differential amplifier.

Condition sensor 26 is of a type having a variable magnitude reversible polarity DC output voltage. When condition sensor 26 is in a condition calling for approximately 50% energization of load 10, there is no output voltage from condition sensor 26 and the collector-emitter current of the differential amplifier transistors 21 and 22 are approximately equal. Transistor 19 is then controlled from output 24–25 of the differential amplifier to cause capacitor 18 to charge and unijunction 16 to fire at an angle of the half cycles of AC voltage 11–12 to provide 50% energization of load 10.

As the load demand increases, the output of condition sensor 26 changes such that input terminal 28 is more positive than input terminal 27. Thus, transistor 22 conducts a larger current and transistor 21 conducts a smaller current. Output 25 of differential amplifier 20 becomes less positive, and output 24 of the differential amplifier becomes more positive. The effect of output 24–25 is to increase the emitter-collector current of transistor 19, causing capacitor 18 to charge at a faster rate and causing unijunction 16 to fire earlier in the half cycle of AC source 11–12, thus increasing power applied to load 10.

If condition sensor 26 calls for energization of load 10 which is less than 50%, then the output voltage of condition sensor 26 is such that terminal 27 becomes more positive than terminal 28. Transistor 21 now conducts a larger collector-emitter current while the collector-emitter current of transistor 22 decreases. The voltage at terminal 25 now becomes more positive while the voltage at terminal 24 becomes less positive. The effect of output voltage 24–25 on transistor 19 is to decrease the charging rate of capacitor 18, causing transistor 16 to fire later in the cycle of AC source 11–12, and thus reducing the power applied to load 10.

Thus far, I have described a conventional control apparatus wherein condition sensor 26 is effective to control differential amplifier 20 and variably energize load 10, dependent upon the condition to which sensor 26 is subjected.

In order to provide improved operation of differential amplifier 20, I provide network 23 including a transistor 30 which has its collector-emitter circuit connected in the common emitter circuit of the differential amplifier. During operation of the control apparatus wherein load 10 is energized in accordance with the condition to which sensor 26 is subjected, transistor 30 has its base-emitter junction controlled by a network including resistor 31, diode 32 and resistor 33. Diode 32 has the same temperature characteristics as the base-emitter junction of transistor 30, and thus transistor 30 functions, in a well-known manner, as a constant current device. Transistor 30 maintains the sum of the collector-emitter currents of transistors 21 and 22 at a constant value and gives improved differential amplifier operation.

Each half cycle, as power supply current flows through capacitor 45, a voltage is developed across a resistor 40, the polarity of the voltage being as indicated. This resistor is connected in parallel with a capacitor 41 and the voltage developed across resistor 40 is applied to capacitor 41 to charge this capacitor, as indicated. Also connected with capacitor 41 are resistors 42 and 43, the series circuit 41, 42 and 43 being connected through a resistor 44 to a power supply capacitor 45. The voltage developed across resistor 42 as a result of this series circuit is such as to tend to bias a transistor 50 to be conductive. However, the voltage developed across capacitor 41 overcomes the tendency of this voltage to turn on transistor 50 and maintains transistor 50 in a state of nonconduction. So long as transistor 50 is nonconductive, its collector-emitter circuit is essentially an open circuit and a capacitor 51 charges to a voltage which is determined by the base-emitter voltage drop of transistor 30 and the voltage drop across a resistor 52.

Upon initial application of AC source 11–12 or of an interruption of AC source 11–12, and the subsequent restoration of this voltage source, transistor 30 is effective to function for a time period as a means to soft start the energization of load 10. This is accomplished by changing the control of transistor 30 during the time period.

Assume that AC source of voltage 11–12 is interrupted. When this occurs capacitor 41 discharges quickly through resistor 40, this resistor being a small resistor in the range of 200 ohms, and capacitor 41 being in the range of 35 microfarads. A capacitor 60, which was charged to the polarity indicated from power supply capacitor 45, now discharges through the base-emitter circuit of transistor 50, turning this transistor on and quickly discharging capacitor 51. This action, namely the discharging of capacitors 41 and 51, takes place in a short time period and even with a momentary failure of source 11–12, the restoration of this source causes soft starting of load 10.

Restoration of source 11–12 first causes DC voltage to appear at capacitor 45. Capacitor 51 charges from source 45 over a time period as determined by the magnitude of resistor 31 and capacitor 51. By way of example, resistor 31 may be 51,000 ohms and capacitor 51 may be 250 microfarads, giving a time constant of 12.75 seconds. As capacitor 51 charges during this time period, the base-emitter forward bias of transistor 30 gradually increases; the total differential amplifier current gradually increases; the state of conduction of transistor 19 gradually increases; the rate of charging of capacitor 18 gradually increases; and the firing angle of unijunction 16 gradually advances. By the end of the given time period, the firing angle of unijunction 16 has been advanced to the point determined by the condition to which condition sensor 26 is subjected. Thus, load 10 has been energized in a soft start manner and gradually brought up to the energization level determined by condition sensor 26.

Upon initial application of AC source 11–12, DC voltage appears at capacitor 45 and load 10 is also energized in a soft start manner, as described above.

I claim as my invention:

1. Control apparatus for use with condition sensing means and a load to variably energize the load from a source of AC voltage in accordance with the magnitude of a sensed condition, and to provide soft start upon initial energization; the apparatus comprising;
   a different amplifier having input means adapted to be connected to the condition sensing means, having output means adapted to control the energization of the load, and having a circuit element connected to constitute a common input element of said differential amplifier and to provide constant current stabilization of said differential amplifier,
   and means connected in controlling relation to said circuit element and adapted to be controlled from the source of AC voltage to respond to interruption of the source of AC voltage and its subsequent restoration to institute a time period wherein said circuit element is controlled to soft start the energization of the load during said time period, thereafter the energization of the load being controlled by the condition sensing means.

2. Apparatus as defined in claim 1 wherein the impedance of said circuit element is high during said time period.

3. Apparatus as defined in claim 2 wherein said circuit element is a transistor whose output electrodes are connected to constitute a common input element of said differential amplifier and whose input electrodes are controlled by the last named means.

4. Apparatus as defined in claim 3 wherein said last named means includes a capacitor which is connected to be charged from the AC source and is connected to bias said transistor to be conductive, and wherein said capacitor is discharged upon interruption of the source of AC voltage and is gradually recharged during said time period to gradually increase the state of conduction of said transistor during said time period.

5. Apparatus as defined in claim 4 including a second transistor whose input is adapted to be controlled by the AC source and whose output is connected to discharge said capacitor upon interruption of the source.

6. Apparatus as defined in claim 3 including a diode having temperature characteristics similar to said transistor, and including means connecting said diode in controlling relation to said transistor to cause said transistor to function as a constant current circuit element.

7. Apparatus as defined in claim 6 wherein said last named means includes a capacitor which is connected to be charged from the AC source and is connected to bias said transistor to be conductive, and wherein said capacitor is discharged upon interruption of the source of AC voltage and is gradually recharged during said time period to gradually increase the state of conduction of said transistor during said time period.

References Cited

UNITED STATES PATENTS

| | | | |
|---|---|---|---|
| 2,942,174 | 6/1960 | Harrison | 323—22 |
| 3,310,688 | 3/1967 | Ditkofsky. | |
| 3,353,091 | 11/1967 | Matsumoto | 323—4 |

JOHN F. COUCH, *Primary Examiner.*

A. D. PELLINEN, *Assistant Examiner.*